United States Patent [19]

Widmann

[11] 4,373,337
[45] Feb. 15, 1983

[54] TURBOCHARGED INTERNAL COMBUSTION ENGINE WITH SPARK IGNITION

[75] Inventor: Wolfgang Widmann, Ludwigsburg, Fed. Rep. of Germany

[73] Assignee: Daimler-Benz A.G., Stuttgart, Fed. Rep. of Germany

[21] Appl. No.: 179,258

[22] Filed: Aug. 18, 1980

[30] Foreign Application Priority Data

Aug. 18, 1979 [DE] Fed. Rep. of Germany ....... 2933556

[51] Int. Cl.³ .............................................. F02B 37/00
[52] U.S. Cl. ............................................................ 60/611
[58] Field of Search ............................. 60/611; 123/564

[56] References Cited

U.S. PATENT DOCUMENTS

| 2,988,070 | 6/1961 | Brueder | 123/564 X |
| 4,207,743 | 6/1980 | Ecomard et al. | 60/611 |

FOREIGN PATENT DOCUMENTS

| 2416287 | 10/1975 | Fed. Rep. of Germany | 60/611 |
| 2435707 | 2/1976 | Fed. Rep. of Germany | 60/611 |
| 186055 | 11/1936 | Switzerland | 60/611 |
| 469812 | 8/1975 | U.S.S.R. | 60/611 |

*Primary Examiner*—Michael Koczo
*Attorney, Agent, or Firm*—Paul M. Craig, Jr.

[57] ABSTRACT

An internal combustion engine with spark ignition having an exhaust gas turbocharger. Supercharger air from the turbocharger is conveyed through a charger air line or pipe to an intake manifold of the internal combustion engine. A throttle valve is provided for the power control of the engine in a path of the supercharger air, especially at an inlet to the intake manifold. A bypass air line or pipe is connected to the charger air line or pipe, with the bypass air line extending to a position upstream of the turbocharger. A further throttle valve is arranged at the bypass air line with both throttle valves being mechanically connected with each other in such a manner that one throttle valve closes when the other throttle valve opens, and vice versa.

5 Claims, 4 Drawing Figures

TURBOCHARGED INTERNAL COMBUSTION ENGINE WITH SPARK IGNITION

The present invention relates to an internal combustion engine and, more particularly, to an internal combustion engine with spark ignition having an exhaust gas turbocharger, with supercharging air from the turbocharger being conveyed through a charger air pipe to an intake manifold of the internal combustion engine and with a throttle valve being provided for the power control in a path of the supercharger air, especially at the inlet to the intake manifold, and with a bypass air pipe being connected to the charging air pipe, which bypass or recirculating air pipe extends upstream of the supercharger, with an additional throttle means being arranged at an inlet cross section of the bypass air pipe.

An internal combustion engine of the aforementioned type is proposed in, for example, Auslegeschrift No. 1,751,061 wherein a throttle means consisting of a spring loaded control piston is disposed at an inlet cross section of the bypass air pipe, with an opening enclosing the throttle means taking place in dependence upon a differential pressure formed from a static pressure at a level of the throttle valve at an inlet of the intake manifold of downstream thereof and from a pressure occurring between a throttle valve and the supercharger. The opening of the throttle means at the inlet cross section of the bypass air pipe or air line is effected in order to prevent the pumping limit of the supercharger from being exceeded in a downward direction in certain charging condition ranges since, if a value drops below the pumping limit, the supercharger is subject to high stresses and strong charging noises occur. A disadvantage of this proposed construction resides in the fact that the throttle means, operating with a differential pressure, is expensive from a constructional viewpoint and has the functional disadvantage that it responds only with a delay since the ducts leading from the charging air pipes or charging air lines through the throttle means must first be evacuated before the control piston can assume a predetermined position.

The aim underlying the present invention essentially resides in providing an internal combustion engine with spark ignition having an exhaust gas turbocharger and a bypass air pipe having a throttle means disposed at an inlet cross section thereof with the actuation of the throttle means being accomplished in such a manner that a delay free response is made possible.

In accordance with advantageous features of the present invention, the throttle means at the bypass air pipe is constructed as a throttle valve with the throttle valve being connected mechanically with the throttle valve for controlling the power of the internal combustion engine. The interconnection between the throttle valves is accomplished in such a manner that one throttle valve closes when the other throttle valve is opened and vice versa.

By a construction of the throttle means at the inlet cross section of the bypass air pipe as a throttle valve in accordance with the present invention as well as by the mechanical connection of the throttle valve for controlling the power of the internal combustion engine with the throttle valve in the bypass air pipe, it is possible to attain a simple, direct, and service-free regulation of the bypass air pipe which is mechanically actuated and one wherein there is no time delays.

During an acceleration of the internal combustion engine with associated transmission in gear, the exhaust gas turbocharger is maintained at its speed which means that, if during a shifting and braking process the throttle valve for the power control is suddenly closed, the throttle valve to the bypass air pipe is opened automatically. Thus, the gas velocity causing the mass inertia of the supercharger is initially maintained. In case of a short term re-opening of the throttle valve for power control, the full supercharger pressure is immediately available.

In a partial load range wherein the internal combustion engine works as a naturally aspirated engine, i.e., an unsupercharged engine, the supercharger also yields a supercharger pressure depending upon the design or construction of the supercharger. This pressure is again reduced at the throttle point. In the regulating device of the present invention, no excess pressure is produced in the charger air pipe due to the flow bypass so that the exhaust gas counterpressure is reduced and the supercharger can perform a smaller amount of compression work. This last feature leads to a lower intake temperature of the internal combustion engine and all of these features have a positive effect on the fuel consumption of the engine in the partial load range.

Spark ignition internal combustion engines with exhaust gas turbochargers are, for the most part, very difficult to regulate and such difficult in regulation is frequently manifested by a jerk-like startup of the supercharger. Depending on the construction and design of the engine, the present invention attains a good degree of metering with the gas or accelerator pedal. By a closing of the throttle valve at the bypass air pipe and an opening of the throttle valve for power control, a smooth transistion is achieved from the unsupercharged range into the supercharged range.

In accordance with further features of the present invention, the throttle valves may be joined by means of linkage members in such a manner that the throttle valve at the bypass air pipe closes earlier than the throttle valve for the power control of the engine, whereby a smooth transistion is achieved from the unsupercharged operation of the engine to the supercharged operation thereof. The degree of leading of the closing of the throttle valve at the bypass air pipe depends essentially on the characteristic curve systems of the internal combustion engine and the supercharger.

Advantageously, both throttle valves may be arranged following the charging air pipe in parallel to each other in valve pipe sockets subdividing the supercharging air.

Accordingly, it is an object of the present invention to provide an internal combustion engine with an exhaust gas turbocharger which avoids, by simple means, shortcomings and disadvantages encountered in the prior art.

A further object of the present invention resides in providing an internal combustion engine with spark ignition having an exhaust gas turbocharger which ensures that the supercharger is not subjected to high stresses nor the generation of strong charging noises.

Yet another object of the present invention resides in providing an internal combustion engine with spark ignition having an exhaust gas turbocharger which enables a simple, direct and service free regulation of the supercharger while minimizing any delays in response times.

A further object of the present invention resides in providing an internal combustion engine with spark ignition having exhaust gas turbocharger which functions reliably under all operating conditions.

A still further object of the present invention resides in providing an internal combustion engine with spark ignition having an exhaust gas turbocharger which is simple in construction and therefore relatively inexpensive to manufacture.

These and other objects, features, and advantages of the present invention will become more apparent from the following description when taken in connection with the accompanying drawing which shows, for the purpose of illustration only, one embodiment in accordance with the present invention, and wherein.

Figure 1:
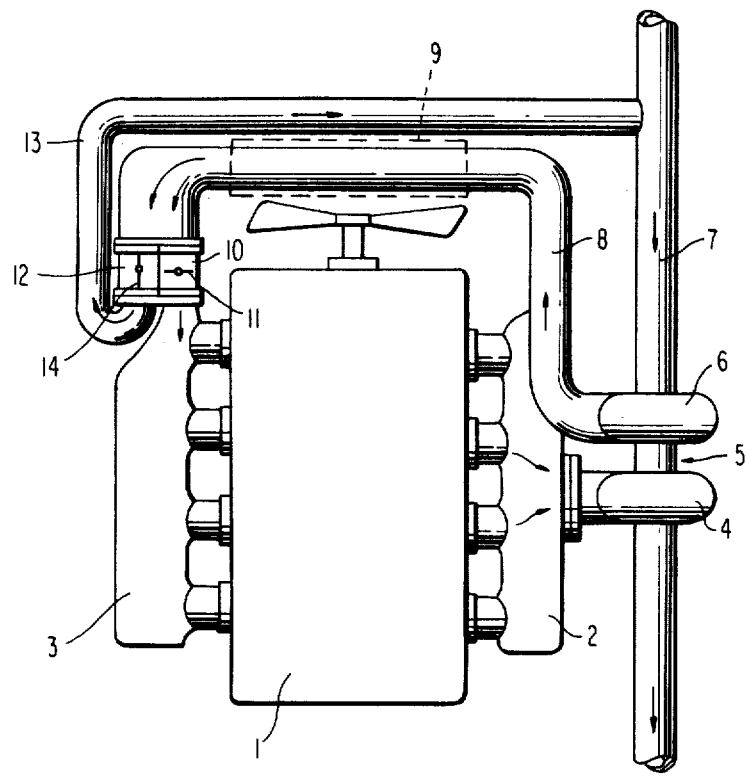
FIG. 1 is a partially schematic top view of an internal combustion engine with an exhaust gas turbocharger and throttle valve at an inlet cross section of a bypass air line in accordance with the present invention.

Referring now to the drawings wherein like reference numerals are used throughout the various views to designate like parts and, more particularly, to FIG. 1, according to this Figure, an internal combustion engine 1 is provided with an exhaust gas manifold 2 and an exhaust portion thereof and an intake manifold 3 and intake portion thereof. A turbine 4 of an exhaust gas turbocharger generally designated by the reference numeral 5 is connected to the exhaust gas manifold 2, with a supercharger 6 of the turbocharger 5 drawing in air from an intake pipe 7 and urging the drawn-in air through a charging air pipe or line 8 and a charging air cooler 9 to the intake manifold 3.

A valve socket 10 is arranged between an end of the charging air line 8 and the intake manifold 3, with a throttle or butterfly valve 11 for power control of the engine 1 being arranged in the valve socket 10. The throttle valve 11 is actuated in conventional manner by way of a lever and linkage means (not shown) connected to, for example, a gas or accelerator pedal. A second valve socket 12 is disposed in parallel to the valve socket 10 at the end of the charging air line 8 with a bypass air line or pipe 13 being connected to the second valve socket 12. The bypass air line 13 leads to the intake pipe 7 and terminates in the intake pipe 7 at a position upstream of the supercharger 6. A throttle or butterfly valve 14 is arranged in the valve socket 12 with the throttle valve 14 being mechanically connected to the throttle valve 11 in the valve socket 10 in such a manner that, when the throttle valve 11 is open, the throttle valve 14 is closed and vice versa. Additionally, the throttle valves 11, 14 are interconnected in such a manner that the throttle valve 14 closes somewhat earlier before the throttle valve 11 is entirely in an open position.

Figure 2:
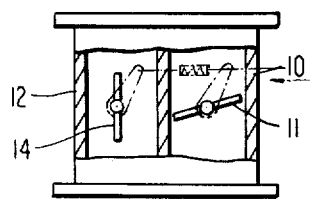
FIG. 2 is a partial cross sectional detailed view illustrating a position of a throttle valve for a power control of the engine and a position of a throttle valve in the bypass air line during an idling of the internal combustion engine.
Figure 3:
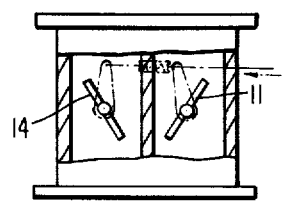
FIG. 3 is a detailed view illustrating the positions of both throttle valves during a partial load operation of the internal combustion engine.

During an idling of the internal combustion engine 1, the throttle valves 11, 14 assume the positions in the valve sockets 10, 12 indicated in FIG. 2, wherein the throttle valve 11 is closed and the throttle valve 14 is entirely open. During a partial load operation of the internal combustion engine, the throttle valves 11, 14 are in the position illustrated in FIG. 3 and the internal combustion engine 1 still operates as an unsupercharged engine. A part of the fresh air coming in from the supercharger 6 is taken in by the internal combustion engine 1 with the other part being recirculated past the throttle valve 14 by way of the bypass air line 13 and being reintroduced into the supercharger 6 on an intake side thereof with out being re-measured by a fuel metering unit (not shown) if such unit is present.

Figure 4:
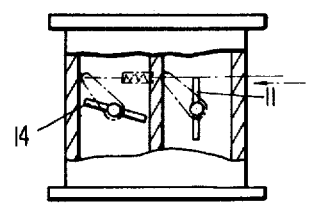
FIG. 4 is a detailed view illustrating the positions of both throttle valves during operation of the internal combustion engine at full load.

As shown in FIG. 4, during a supercharging operation of the internal combustion engine 1, the throttle valve 11 is almost or entirely open and all fresh air coming in from the supercharger 6 is directed into the intake manifold 3 of the internal combustion engine 1 and, during such operation of the internal combustion engine 1, the throttle valve 14 for the bypass air line 13 is completely closed.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. An internal combustion engine with spark ignition, the engine including an exhaust gas turbocharger means for supplying supercharging air to the engine, a charging air line means for conveying supercharging air to an intake manifold of the engine, a throttle valve means arranged in a path of flow of the supercharging air for enabling a power control of the engine, and a bypass air line means connected to the charging air line means and terminating in an air inlet line at a position upstream of the turbocharger means, and a throttle means arranged in an inlet cross section of the bypass air line means, characterized in that the throttle means is constructed as a further throttle valve means, and in that means are provided for mechanically connecting the throttle valve means and further throttle valve means such that the throttle valve means opens as the further throttle valve means closes and vice versa, with the further throttle valve means of the bypass air line means closing somewhat earlier before the other throttle valve means is entirely open.

2. An internal combustion engine according to claim 1, characterized in that the throttle valve means for enabling a power control of the engine is disposed at an inlet of the intake manifold.

3. An internal combustion engine according to one of claims 1 or 2, characterized in that the mechanical connecting means includes linkage members connected to the further throttle valve means and the other throttle valve means.

4. An internal combustion engine according to claim 3, characterized in that valve socket means are provided for accommodating the throttle valve means and further throttle valve means and for subdividing the supercharging air.

5. An internal combustion engine according to claim 4, characterized in that the valve socket means are disposed between an end of the charging air line means and an inlet of the intake manifold, and in that the throttle valve means and further throttle valve means are disposed in the valve socket means and parallel to each other.

* * * * *